June 29, 1926.
W. W. HAWKINS
MAGNETO
Filed April 3, 1922
1,590,506
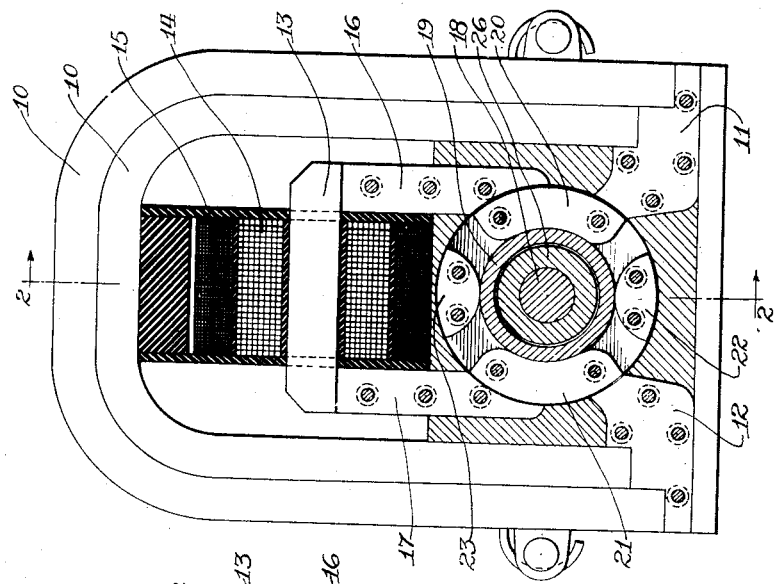
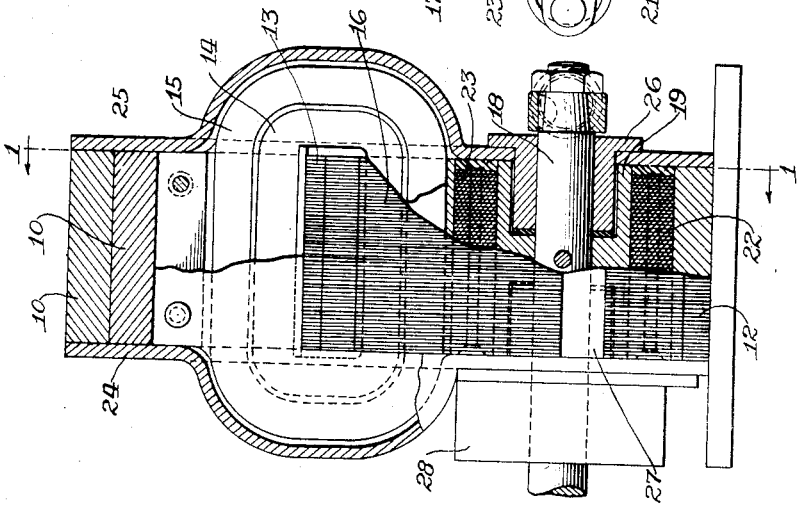
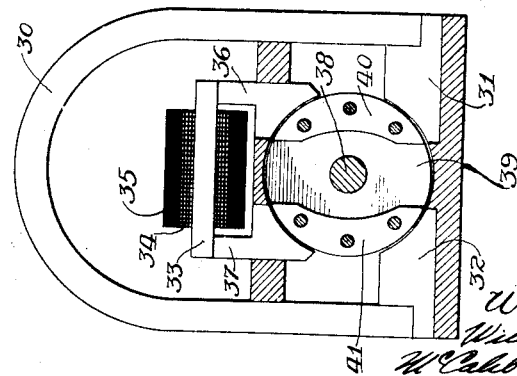
Inventor.
Wm. W. Hawkins.
Williams Bradbury
McCaleb & Pierce
Attys.

Patented June 29, 1926.

1,590,506

UNITED STATES PATENT OFFICE.

WILLIAM W. HAWKINS, OF BROOKLYN, NEW YORK, ASSIGNOR TO WEBSTER ELECTRIC COMPANY, OF RACINE, WISCONSIN, A CORPORATION OF WISCONSIN.

MAGNETO.

Application filed April 3, 1922. Serial No. 549,000.

The invention relates to improvements in magnetos, and particularly to magnetos of the oscillating type such as are used for ignition purposes with internal combustion engines.

The object of the present invention is to provide a magneto having an induction coil so related to the inductor elements of the magneto that in one position of the inductor a path for the flow of flux from the permanent magnet through the induction coil core is provided, and in another position of the inductor, the induction coil core is short circuited.

A feature of the invention is the provision of a magneto such as above described in which secondary inductor elements are provided on the rotor which act to momentarily complete a path for the flow of flux through the induction coil winding prior to the completion of the path by the main inductor elements.

Other features and advantages of the invention will appear from time to time as the description of the invention progresses.

In the drawings,

Figure 1 is a vertical sectional view substantially on the line 1—1 of Figure 2, looking in the direction of the arrows;

Figure 2 is a side view of the device, partly in section, and with parts broken away, and Figure 3 is a view similar to Figure 1 but showing a modified form of the device.

It is believed that this invention will be best understood by a detailed description taken in connection with the accompanying drawings.

Referring now to the drawings in which like reference characters indicate like parts in the several views, 10—10 indicates the usual U-shaped permanent magnets which are provided with the laminated pole pieces 11 and 12. Arranged in the space within the upper part of the magnets 10—10 is an induction coil consisting of the core 13, primary winding 14 and secondary winding 15. The core 13 is provided with the extensions 16 and 17 of laminations of magnetizable material, the ends of which terminate in arcs of a circle which is coincident with the circle of the arc formed by the extremities of the pole pieces 11 and 12.

Rotatably mounted concentrically with the surfaces of the pole pieces 11 and 12 and the extremities of the extensions 16 and 17 is the rotor shaft 18 to which is rigidly secured the supporting structure 19 of non-magnetic material. Carried by the structure 19, at diametrically opposite sides thereof, are the inductor elements 20 and 21 formed of laminations of magnetizable material. The inductor elements 20 and 21 are substantially arcuate and each extends over an angle of substantially 90°. Also mounted within the supporting structure 19 are the auxiliary inductor elements 22 and 23 which are positioned midway between the inductor elements 20 and 21 and extend through a smaller arc than do the inductors 20 and 21.

The end cover plates 24 and 25 are provided, each being formed with an outwardly curved portion to accommodate the coils 14 and 15, as shown in Figure 2. Secured to the top plates 24 and 25, in any desired manner, are the bearing members 26 and 27 for the shaft 18. These bearing members 26 and 27 extend into, but do not touch the sides of cylindrical openings in the supporting member 19.

The pole pieces 11 and 12 and the downwardly extending ends of the core extensions 16 and 17 are surrounded by non-magnetic material which may be cast about the parts in a manner which is well understood in the art.

Secured to the cover plate 24 is a housing 28 within which may be positioned the usual interrupter elements. It will be understood that one end of each of the induction coils 14 and 15 is grounded, and that the other end of the coil 14 passes to the usual interrupter contacts in parallel with which is the usual condenser. The ungrounded end of the coil 15 will extend in the usual manner to a spark plug or a flier of the distributor of the engine.

The rotor element is shown substantially in its normal position in Figure 1, and is moved in a clockwise direction as viewed in this figure to its cocked position by mechanism associated with a moving part of the engine in a manner which is well known and which need not be herein shown or described.

In passing to cock or set position, the rotor is rotated through about or a little over 90°. After being moved to cocked position, the inductor will be rapidly returned to its normal position by means of the usual inductor springs, as is common in magnetos of this character.

It will be noted that when the rotor is in its normal position, a path is closed for the flow of flux from the pole pieces 11 and 12 through the core extensions 16 and 17, and through the core 13, so that the core is normally in a substantially saturated condition. In moving the rotor to its cocked position, however, through an angle of substantially 90°, the inductor element 20 will take up a position so as to bridge the gap between the pole pieces 11 and 12 and the core 13 will be short circuited. As the rotor starts to return to its normal position, a path for the flow of flux will be momentarily completed by the auxiliary inductor elements 22 and 23. This path, however, will be of limited extent and will exist for but an exceedingly brief interval of time, after which the path for the flow of flux to the core 13 will be again interrupted but will immediately be completed by the inductor elements 20 and 21 coming into their normal position, as shown in Figure 1.

The momentary closure for the flow of flux through the core 13 by the auxiliary inductor elements 22 and 23 operates to set up oscillations in the electrical structure of the induction coil, and the complete closure of the path between the magnet pole pieces and the core extensions an instant later causes the core 13 to become magnetically saturated. The interrupter contacts are arranged to be opened as the rotor approaches its normal position, thus adding the effect of the condenser discharge which, as is usual, is in parallel with the contacts, to the electrical disturbances created in the induction coil. The result of the various effects is that a high potential impulse is produced in the secondary coil 15 of the transformer. Applicant is unable to set forth fully the complete theory of the electrical effects which occur but he does know that the structure herein set forth operates to produce a spark of great intensity.

Referring now to Figure 3, 30 indicates the permanent magnet having the pole pieces 31 and 32. An induction coil is shown having a core 33, primary winding 34 and secondary winding 35. The core 33 is provided with the extension members 36 and 37, the free ends of which terminate adjacent to the outer surface of the magneto rotor. Concentrically arranged between the arcuate surfaces of the pole pieces 31 and 32 and the core piece extensions 36 and 37 is the rotor shaft 38 to which is rigidly secured the inductor supporting member 39. Carried by the supporting member 39 are the laminated inductor elements 40 and 41, each of which extends through an arc of somewhat more than 90°.

It will be noted from the description of the arrangement of Figure 3 that the structure of Figure 3 is very similar to that shown in Figures 1 and 2, except that the rotor does not carry the auxiliary inductor elements, such as 22 and 23, and the inductor elements 40 and 41 of Figure 3 are somewhat greater in extent than are the corresponding inductor elements 20 and 21 of Figure 1. Otherwise, the arrangement of Figure 3 may be substantially like that shown in Figures 1 and 2.

The operation of the structure of Figure 3 will also be very similar except that due to the absence of the auxiliary inductor elements, there will be no primary excitation of the induction coil elements. In the arrangement of Figure 3, when the rotor has been moved to its cocked position, the inductor 40 will be positioned across the pole pieces 31 and 32, and will entirely short circuit the core extensions 36 and 37. When, however, the rotor is snapped back to its normal position by the inductor springs, a path for the flow of flux is completed from the pole pieces 31 and 32 to the core piece extensions 36 and 37, causing a rush of flux through the core 33, and setting up an impulse of current in the primary winding 34. As the rotor approaches its normal position, the usual interrupter contacts will function, causing the condenser in parallel therewith to discharge in the usual manner. The electrical oscillations thus set up in the primary coil 34 act inductively on the secondary coil 35 to induce therein an impulse of great intensity.

While details of two embodiments of applicant's invention are disclosed in the drawings and described above, it is to be understood that applicant contemplates still further modifications and his invention is to be limited merely by the scope of the appended claims.

Having now described the invention, what I claim is new and desire to secure by Letters Patent of the United States is:

1. In an oscillating magneto, a permanent magnet, pole pieces therefor, an induction coil, a core for said coil, a rotor, and inductor elements thereon arranged when in normal position to complete a path for the flow of flux from said pole pieces through said core, and when in cocked position to short circuit said core.

2. In an oscillating magneto, a permanent magnet, pole pieces therefor, a rotor adjacent to said pole pieces, an induction coil, a core for said coil, extensions for said core terminating adjacent to said rotor, and inductor elements on said rotor arranged when in normal position to complete a path for the flow of flux from said pole pieces through said extensions and core, and when in cocked position substantially to isolate said extensions from said pole pieces and to short circuit the said extensions.

3. In an oscillating magneto, a permanent magnet, pole pieces therefor, an induction coil mounted in the space within the upper portion of said magnet, a core for said coil, a rotor, and inductor elements thereon arranged when in normal position to complete a path for the flow of flux from said pole pieces through said core, and when in cocked position to separate said core from the flux flow of said pole pieces and to short circuit said core.

4. In an oscillating magneto, a permanent magnet, pole pieces therefor, a rotor adjacent to said pole pieces, an induction coil mounted in the space within the upper portion of said magnet, a core for said coil, extensions for said core terminating adjacent to said rotor, and inductor elements on said rotor arranged when in normal position to complete a path for the flow of flux from said pole pieces through said extensions and core, and when in cocked position to short circuit said extensions and to short-circuit said magnet.

5. In an oscillating magneto, a permanent magnet, pole pieces therefor, an induction coil, a core for said coil, a rotor, and two inductor elements symmetrically mounted thereon and arranged when in normal position to complete a path for the flow of flux from said pole pieces through said core, and when in cocked position to short circuit said core, and to short-circuit said magnet across said pole pieces.

6. In an oscillating magneto, a permanent magnet, pole pieces therefor, a rotor adjacent to said pole pieces, said pole pieces being all located in the same plane transversely of said rotor, an induction coil mounted in the space within the upper portion of said magnet, a core for said coil, extensions for said core terminating adjacent to said rotor, and in substantially the same tranverse plane as said pole pieces, and a pair of inductor elements symmetrically mounted on said rotor and arranged when in normal position to complete a path for the flow of flux from said pole pieces through said extensions and core, and when in cocked position to short circuit said extensions.

7. In an oscillating magneto, a permanent magnet, pole pieces therefor, an induction coil, a core for said coil, a rotor, and two pairs of inductor elements on said rotor in the same transverse plane, one of said pairs of inductor elements being arranged to momentarily complete a path for the flow of flux from said pole pieces through said core during the return movement of said rotor, and the other pair of said inductor elements being arranged to complete a path for the flow of flux from said pole pieces through said core when the rotor is in normal position.

8. In an oscillating magneto, a permanent magnet, pole pieces therefor, an induction coil, a core for said coil, a rotor, a pair of inductor elements thereon arranged when in normal position to complete a path for the flow of flux from said pole pieces through said core, and when in cocked position to short circuit said core, and an auxiliary pair of inductor elements on said rotor arranged to momentarily complete a path for the flow of flux from said pole pieces through said core during the return movement of said rotor.

9. In an oscillating magneto, a permanent magnet, pole pieces therefor, an induction coil mounted in the space within the upper portion of said magnet, a core for said coil, a rotor, a pair of inductor elements thereon arranged when in normal position to complete a path for the flow of flux from said pole pieces through said core, and when in cocked position to short circuit said core, and auxiliary inductor elements on said rotor in the same transverse plane as said first pair of inductor elements arranged to momentarily complete a path for the flow of flux through said core during the return movement of said rotor.

10. In an oscillating magneto, a permanent magnet, pole pieces therefor, a rotor, an induction coil, a core for said coil, extensions for said core terminating adjacent to said rotor, inductor elements on said rotor arranged when in normal position to complete a path for the flow of flux from said pole pieces through said extensions and core, and when in cocked position to short circuit said extensions, and auxiliary inductor elements on said rotor arranged to momentarily complete a path for the flow of flux through said extensions and core during the return movement of said rotor.

11. In an oscillating magneto, a permanent magnet, pole pieces therefor, a rotor, an induction coil mounted in the space within the upper portion of said magnet, a core for said coil, extensions for said core terminating in arcuate surfaces adjacent to said rotor, a pair of inductor elements on said rotor arranged when in normal position to complete a path for the flow of flux from said pole pieces through said extensions and core, and when in cocked position to short circuit said extensions, and a pair of auxiliary inductor elements on said rotor in the same plane as said first pair of inductor elements arranged to momentarily complete a path for the flow of flux through said extensions and core during the return movement of said rotor.

12. In an oscillating magneto, a permanent magnet, pole pieces therefor, an induction coil, a core for said coil, a rotor, and two sets of inductor elements on said rotor, one of said sets being arranged to momentarily complete a path for the flow of flux from said pole pieces through said core during the return movement of said rotor, and the other set of said inductor elements being arranged to complete a path for the flow of flux through said core for a more extended period of time.

13. In an oscillating magneto, a permanent magnet, pole pieces therefor, an induction coil, a core for said coil, a rotor, and two sets of inductor elements on said rotor, one of said sets being arranged to cause a preliminary closure of the path for the flow of flux from said pole pieces through said core during the return movement of said rotor, and the other set being arranged to subsequently close said path.

In witness whereof, I hereunto subscribe my name this 29 day of March, 1922.

WILLIAM W. HAWKINS.